United States Patent [19]

Hilal et al.

[11] Patent Number: 4,894,556
[45] Date of Patent: Jan. 16, 1990

[54] HYBRID PULSE POWER TRANSFORMER

[75] Inventors: Mohamed A. Hilal; Jerome F. Parmer; Scott D. Peck; Eddie M. W. Leung, all of San Diego, Calif.

[73] Assignee: General Dynamics Corporation, Convair Division, San Diego, Calif.

[21] Appl. No.: 61,761

[22] Filed: Jun. 15, 1987

[51] Int. Cl.$^4$ .......................... H03K 3/00; H01F 36/00
[52] U.S. Cl. ..................................... 307/106; 307/149; 174/125.1; 505/870; 505/884; 323/360; 336/DIG. 1
[58] Field of Search .................... 307/106, 306, 149; 336/DIG. 1; 361/19, 141; 323/360; 335/216; 174/125.1; 505/856, 865, 869, 870, 884, 887

[56] References Cited

U.S. PATENT DOCUMENTS

| | | | |
|---|---|---|---|
| 2,987,631 | 6/1961 | Park, Jr. | 336/DIG. 1 |
| 3,243,654 | 3/1966 | Wright | 335/216 |
| 3,263,133 | 7/1966 | Stekly | 335/216 X |
| 3,372,470 | 3/1968 | Bindari | 505/884 X |
| 3,662,093 | 5/1972 | Wilson et al. | 505/887 |
| 3,701,906 | 10/1972 | Denel et al. | 336/DIG. 1 X |
| 3,767,842 | 10/1973 | Bronca et al. | 505/887 X |
| 4,327,244 | 4/1982 | Horváth | 505/887 X |
| 4,470,090 | 9/1984 | Carr, Jr. | 505/850 X |
| 4,554,407 | 11/1985 | Ceresara et al. | 505/887 X |
| 4,700,257 | 10/1987 | Bekhaled | 336/DIG. 1 X |

Primary Examiner—William M. Shoop, Jr.
Assistant Examiner—Sharon D. Logan
Attorney, Agent, or Firm—John R. Duncan; Frank D. Gilliam

[57] ABSTRACT

A pulsed transformer utilizing the transition of the primary winding from a superconducting state to a normal state to increase the efficiency of energy transfer to the secondary winding thereof and hence to a load across the secondary winding. The primary winding is constructed as a composite which has minimal resistance when in a superconductive state and significantly higher resistance when in a normal or critical state.

6 Claims, 2 Drawing Sheets

HYBRID PULSE POWER TRANSFORMER

BACKGROUND OF THE INVENTION

1. Field of Invention

The invention relates to high power pulse transformers for microwave generators, advanced propulsion systems, electromagnetic launchers, etc., requiring energies on the order of 10 joules to be supplied within a few milliseconds.

2. Description of the Prior Act

Pulsed transformers are presently proposed as energy compression devices for the above referenced and other purposes. These transformers consist of both normal or non-superconducting primary and secondary windings and superconducting primary and normal secondary windings or portions of the primary with a pulse or discharge resistor or resistors in parallel with the primary or portions of the primary for pulsing or power transfer to the secondary winding. The pulse or discharge resistor circuit is connected across the primary for power transfer. This energy transfer between windings produces extra high voltages which severely limit the practicability of such an energy compression scheme for exceeding high power transfer due to the magnitude of the insulation required and resulting weight penalty. To compress 120 Million Joules (MJ) of energy from a normal conducting primary to a normally conductive secondary in a time span of from 2 to 5 micro seconds (MS) creates high voltage in the order of megavolts (MV) within the primary winding. Such magnitude of high voltage represents a critical design problem for an inductor transformer (I/T) system and results in an extremely heavy system because of the massive insulation needed (as aforementioned) to prevent voltage breakdown within and between windings. As a result of the insulation requirements, less than 30% of the primary winding energy is transferable to the secondary and hence to the load in state of the art transformers.

Superconductors are well known in the art since their discovery in the early twentieth century. It is known that certain materials lose all apparent electrical resistance when they are subjected to a very low temperature in the vicinity of absolute zero Kelvin. Of late, newer materials have been discovered that become superconductive at a somewhat warmer temperature (in the liquid nitrogen temperature range.) The transition from the resistive state to the superconducting state occurs abruptly at a critical temperature known as the transition temperature, the particular transition temperature differing for each material.

It is also known that a transition from a superconducting to a normal (resistive) state can be induced in a superconductor by applying a magnetic field to the superconductor; by elevating the temperature of the superconductor and by providing energy in excess of the storage capacity of the superconductor or any combination thereof.

Massive make and break electrical switches are required in the state of the art transformer schemes which work with extremely high voltage that are in the MV ranges. These switches are required to connect and insulate the energy source from the superconductor and to close the circuit to discharge the superconductor through an external resistor for energy transfer. The design of these switches for high current and high voltage have yet to reach the practical stage of development. In most cases, switches handling this level of MV and MA cannot be used respectively.

Examples of prior art device, using superconductive primary and normal secondary are taught by U.S. Pat. Nos. 3,360,692; 3,800,256 and 4,486,800.

Because of the inefficient energy transfer and the unavailability of practical MV and MA switches, the use of a superconductor as a primary of a highly efficient high power pulse transformer capable of multiple or continuous pulsing to a secondary connected load has not been available until the emergence of this instant invention.

SUMMARY OF THE INVENTION

The pulsed power transformer of this invention overcomes the inadequacies of the state of the art pulse power generation and the transfer of pulsed power to a load.

The invention is directed to a new and improved transformer utilizing a normal/superconducting transformer which utilizes the transition of a superconducting primary coil to the normal state to effect efficient high energy transfer from the primary coil to the secondary coil and the ability of the transformer to repetitively supply such energy.

The current in the primary coil of the transformer of the invention is substantially zero during the superconducting quiescent and storage modes. When power transfer to the load is needed, the superconducting primary coil of the transformer is charged to its maximum value of about 100 MJ. When pulsed power transfer is demanded, the transformer primary coil is caused to become normal by one of the aforementioned means, preferably by giving the current to the primary coil an incremented increase, which drives the primary coil to a normal conducting state. The resulting millisecond field collapse induces the required megamp (MA) load in the normal conducting secondary. After discharge, the primary winding is allowed to cool back to below its superconducting state where the sequence of charging and discharging can be repeated.

The number of turns in the primary and secondary can be adjusted to match any inductive, resistance and capacitance (LRC) loads encountered. By way of example and not by way of limitation, the transformer discussed herein, has a solenoidal geometry consisting of a multi-turn primary coil and a single turn secondary coil separated by conventional thermal and electrical insulation.

The conductor of the primary coil winding by way of examples, is constructed from CuNi alloy matrix with a plurality of Nb Ti superconductors embedded therein.

The conductor of the secondary coil winding, by way of example, is constructed from an aluminum alloy (2219-T87) plates. The plates are welded together to form a long "barber pole wrap." The plates are tapered to minimize current flow losses and weight.

The materials of construction of the primary winding coil and the coil wrap spacing provide a substantially linear resistance and induction therein when the coil is driven to a normal state. This feature considerably reduces the voltage produced across and between the coil winding when the primary is driven normal from the expected megavolts between adjacent coils and windings of state of the art transformer to a low voltage, in the range of 20 thousand volts. Voltage in this range can be easily handled (switched) by conventionally known switches. Because of the low voltage high current resulting in the primary, a very efficient power transfer can be achieved. Power transfer in excess of 90% is anticipated. Because of the low voltage established when the primary winding goes from a superconducting state to a normal state, conventional insulation can be employed to insulate the primary and secondary windings which can be positioned in close proximity.

An object of the invention is to produce a highly efficient transfer of extremely high power pulses from the primary coil of a transformer to the secondary coil thereof utilizing conventional switches and insulation means.

Another object of the invention is to provide a high power pulse transformer which utilizes a superconductive/normal primary coil winding.

Still another object of the invention is to construct the primary coil conductor and wind that conductor into a primary coil winding which has minimal internal resistance when in a superconductive state and has sufficiently high resistance which is linearly disposed therein which substantially eliminates voltage thereacross when the primary coil winding is driven normal.

Still another object of the invention is to provide energy transfer between the primary coil winding and the secondary coil winding without the need of an external resistance across the primary coil winding.

Yet another object of the invention is to provide a transformer capable of higher power pulses at reduced construction, operating costs and weight when compared to the state of the art devices.

The manner of accomplishment of these objectives and the presence or other advantages of the present invention will become apparent as the description proceed with reference to the drawing in which:

DESCRIPTION OF THE PREFERRED EMBODIMENT

Figure 1:
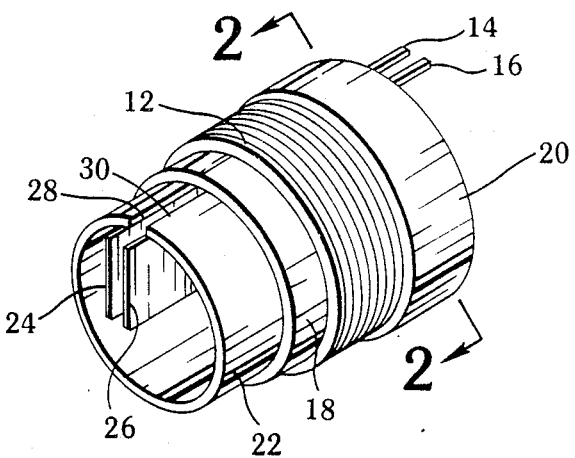
FIG. 1 is a schematic perspective showing of a solenoid geometry hybrid pulse power transformer (HPPT) constructed according to the invention.
Figure 2:
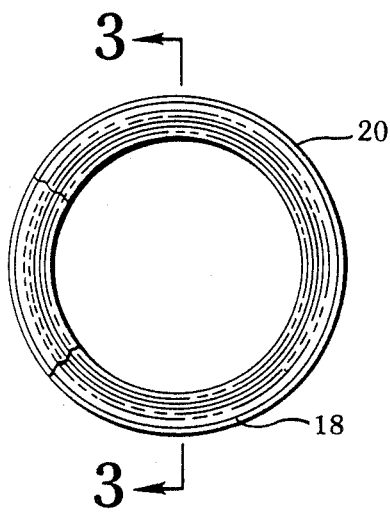
FIG. 2 is a cutaway end view taken along line 2—2 of FIG. 1.
Figure 3:
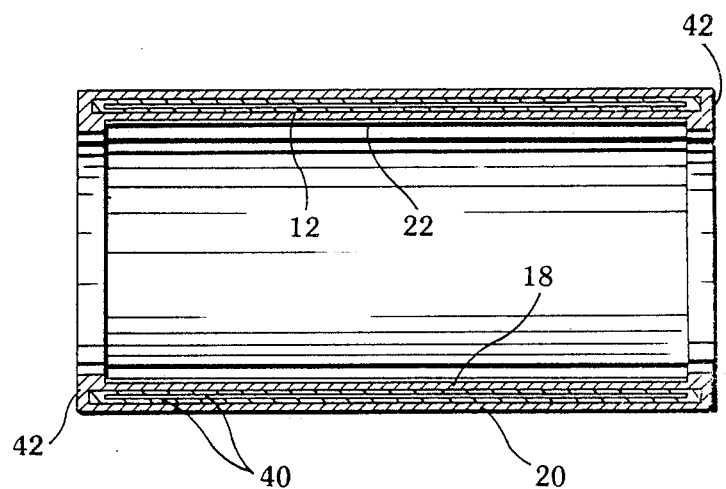
FIG. 3 is a cutaway side view taken along line 3—3 of FIG. 2.

Referring now to the various figures and particularly to FIGS. 1-3 which depict a perspective showing of the preferred embodiment of the hybrid pulse power transformer (HPPT) 10 of the invention. The superconducting/normal primary winding 12 is supplied current through input leads 14 and 16. The primary winding 12 comprises a plurality of conductor windings typically in the range of 124 turns wound on an inner load insulating shell 18 and enclosed by a similar shaped load bearing outer shell 20. The secondary coil winding 22 consists of one or two turns (one turn shown) formed or highly conductive plate material such as, for example, aluminum alloy 2219.T87 plate. Output leads 24 and 26 are attached to spaced apart end surface 28 and 30 respectfully of the secondary coil winding.

Figure 4:
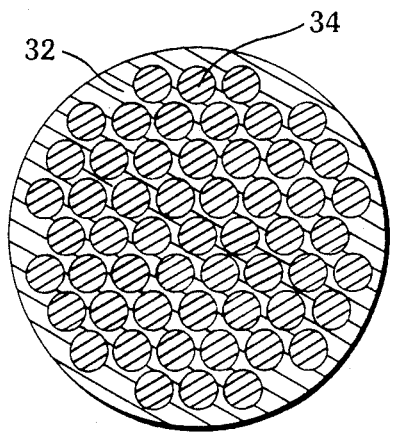
FIG. 4 is an enlarged end view showing a first embodiment of a primary conductor.
Figure 5:
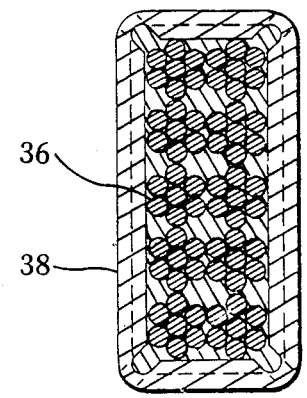
FIG. 5 is an end view enlarged showing of a second embodiment of a primary conductor.

Referring now to FIGS. 4 and 5 which depict two embodiments of the conductor of the primary coil winding 12. The first embodiment depicted in FIG. 4 uses a copper-nickel for the matrix 32 and a plurality of NbTi superconductors 34 positioned within the matrix 32. The conductor shown is approximately 0.15 Cm in diameter. The conductors are twisted into a selected number of sub-cables. Typically ten sub-cables are employed, each is comprised of six strands or the superconductor NbTi/ Nichrome V strands in a volume ratio of 2:1, wrapped around a dummy Nichrome V strand. A cable of this configuration carries 20,000 amps. with zero resistance at liquid helium temperatures ( 4.2 K.) A conductor thus constructed has substantially zero resistance at its superconducting temperature and a high uniform resistance linearly displaced along its length at its normal conducting temperature. To maximize apparent uniform resistance in the winding, the diameter of the conductor along its length as well as the spacing between the adjacent coil windings can be varied.

Referring now specifically to FIG. 5, the second embodiment of the primary coil winding conductor is shown. NbTi superconductors 36 are plated with Cu then bundled within a Nichrome V ( 80 Ni-20 cr ) jacket 38 and soldered thereto by a solder of 50% tin and 50% lead. The jacket is formed with under cut grooves to facilitate cooling with liquid Helium or the like.

It should be understood that the showing of FIGS. 4 and 5 are merely examples of material usable as a superconductor/normal primary winding to practice the invention. There are other materials available in matrix or alloy form that are suitable to practice the invention when sized and wound to provide minimum resistance to current flow at superconducting temperatures and a high resistance linearly displaced along the conductor of the winding when normal conducting, thus the only limitation is low resistance at its superconducting temperature and uniformly displaced high resistance at normal conducting temperature.

Referring again to FIGS. 2 and 3, FIG. 2 is an end view or a section of the HPPT of FIG. 1 is shown. The various components of construction of FIG. 1 are shown as well as the cooling liquid flow areas 40 for the purpose of cooling. FIG. 3 is a showing taken along line 3—3 of FIG. 2 showing the elements of FIG. 2 and in addition the side plates 42 which confine the cooling liquid and provides rigidity to the HPPT structure.

Figure 6:
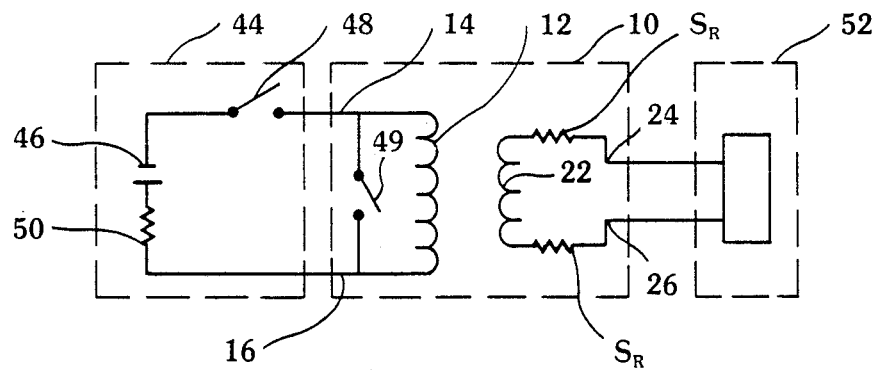
FIG. 6 is a schematic showing of the quiescent mode of the transformers of FIG. 1.

Referring now to FIGS. 6-9 which schematically depict various operating modes of the device of the preferred embodiment. In FIG. 6 the quiescent mode of the primary coil winding in a superconducting state is shown. A prime power and controller portion 44 including a power source 46 which is capable of charging the primary coil winding in a superconducting state and increasing the primary coil winding charge past its capacity to cause the primary coil winding to become normal and an open low current switch 48 is shown. One side of switch 48 is connected to the power source and the other to terminal 14 of the HPPT. A switch 49 is connected between the opposite side of the power source 46 which is electrically common to terminal 16 of the HPPT. Resistor 50 represents the inherent resistance in the conductor from the power source to the primary 12 of the HPPT. The secondary winding 22 is connected by terminals 24 and 26 to a load 52. Sr represents series resistance in the leads from the secondary 22 to terminals 24 and 26.

Figure 7:
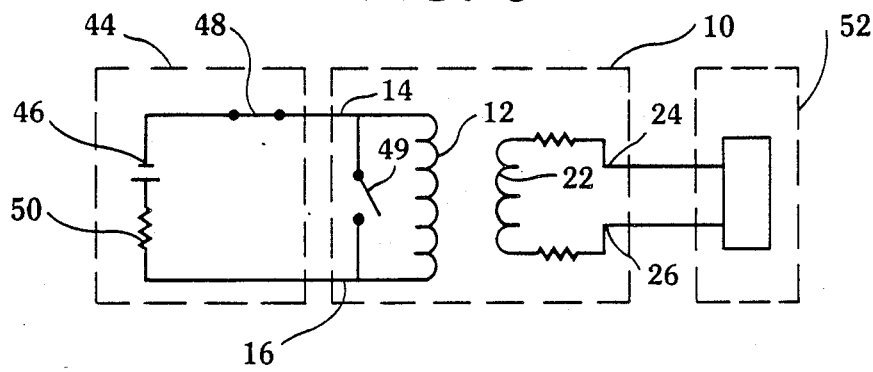
FIG. 7 is a schematic showing of the charge mode of the transformer of FIG. 1.

FIG. 7 depicts the charge up mode. In this mode switch 48 is closed allowing the primary coil winding 12 which is now in the superconducting mode to be fully charged. The charge up takes approximately 250 milliseconds.

Figure 8:
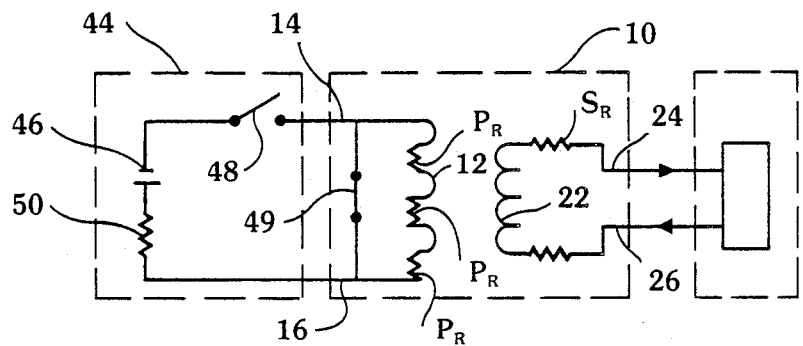
FIG. 8 is a schematic snowing of the discharge mode of the transformer of FIG. 1.

FIG. 8 depicts the discharge mode. In this mode the primary is caused to become normal and simultaneously switch 48 is opened and switch 49 is closed . Power form the primary is inductively transferred to the secondary coil winding and hence to load 52 in approximately 1 to 5 milliseconds.

Figure 9:
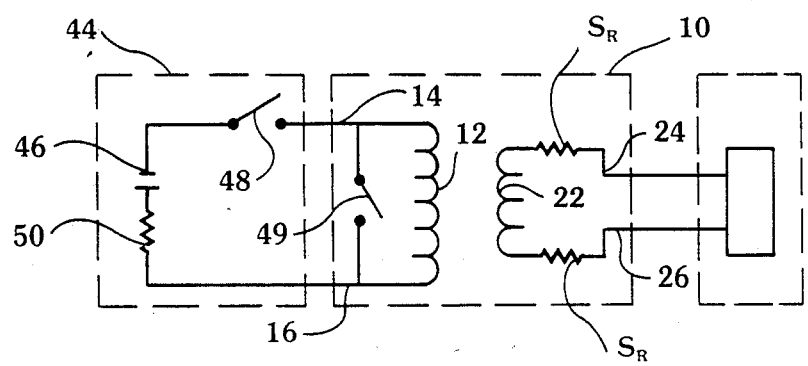
FIG. 9 is a schematic showing of the re-cool mode of the transformer of FIG. 1.

FIG. 9 depicts the re-cool mode. In this mode switch 49 is opened and the primary is re-cooled from a normal conductor to a superconductor.

After approximately 2,000 milliseconds, the approximate time it takes to return the primary coil winding to its superconducting state, the primary can be recharged and the sequence can be repeated.

It should be understood that although in the above description the transfer of the primary coil winding from a superconducting state to a normal conducting state is accomplished by an increase in stored power beyond storage capabilities or the primary coil winding, any known method can be used to accomplish this transition.

In the foregoing specification, the invention has been described with reference to specific exemplary embodiments thereof. It will, however, be evident that various departing from the broader spirit and scope of the invention as set forth in the appended claims. The specifications and drawings are, accordingly, to be regarded in an illustrative rather than in a restrictive sense.

What is claimed is:

1. A highly efficient high power transformer comprising:

a primary winding formed from a conductor means which has a minimal resistance when in a superconducting first state and high substantially uniform resistance along its length when a second conducting state;

a load:

a secondary winding formed from a normal conductor connected across said load;

means for establishing said primary winding in said first state;

power means for charging said primary winding to its maximum capacity with stored energy while in said first state:

means for changing said primary winding from said first state to said second state; and a first and second switch, said first switch in series with said power means which is closed when charging said primary winding and open when discharging said stored energy from said primary winding and said second switch positioned across said primary winding which when open allows said primary winding to become charged and when closed causes said stored energy in said primary winding to be transferred to said secondary winding and said load, said first and second switches are simultaneously switched.

2. The invention as defined in claim 1 wherein said conductor means comprises a composite formed by a matrix of Copper-Nickel embedded with rods of NbTi.

3. The invention as defined in claim 1 wherein said conductor means comprises strands of NbTi plated with Cu surrounded by an outside skin of Copper-Nickel.

4. The invention as defined in claim 2 wherein said conductor means is formed from a plurality of conductors of about 0.15 centimeters in diameter.

5. The invention as defined in claim 1 wherein said windings are wound in the form of a solenoid.

6. The invention as defined in claim 1 wherein said means for changing the primary winding from said first state to said second state is by increasing said stored energy beyond said maximum capacity by said power means.

* * * * *